(12) United States Patent
Brothier et al.

(10) Patent No.: US 7,510,599 B2
(45) Date of Patent: Mar. 31, 2009

(54) DEVICE FOR PURIFICATION OF A GAS FLOW CONTAINING CONDENSABLE VAPOURS

(75) Inventors: Meryl Brothier, Aix en Provence (FR); Jean-Pierre Turchet, Hyeres (FR); Pierre Estubier, Manosque (FR)

(73) Assignee: Commissariat a l'Energie Atomique, Paris (FR)

( * ) Notice: Subject to any disclaimer, the term of this patent is extended or adjusted under 35 U.S.C. 154(b) by 13 days.

(21) Appl. No.: 11/793,644

(22) PCT Filed: Dec. 20, 2005

(86) PCT No.: PCT/FR2005/051116
§ 371 (c)(1),
(2), (4) Date: Jun. 20, 2007

(87) PCT Pub. No.: WO2006/070152
PCT Pub. Date: Jul. 6, 2006

(65) Prior Publication Data
US 2008/0105127 A1     May 8, 2008

(30) Foreign Application Priority Data
Dec. 27, 2004   (FR) .................................. 04 13944

(51) Int. Cl.
*B03C 3/10*   (2006.01)
(52) U.S. Cl. ........................ 96/29; 95/73; 95/76; 95/77; 95/78; 96/39; 96/40; 96/51; 96/61; 96/63; 96/74; 96/94

(58) Field of Classification Search ...................... 96/29, 96/39, 40, 51, 55, 61, 63, 74, 86, 87, 94; 95/63, 68, 73, 76–78
See application file for complete search history.

(56) References Cited

U.S. PATENT DOCUMENTS 2,667,942 A * 2/1954 Wintermute .................... 96/61
2,740,493 A * 4/1956 Wintermute .................... 95/64

(Continued)

FOREIGN PATENT DOCUMENTS

DE    8905182    4/1989

(Continued)

OTHER PUBLICATIONS

International Search Report Listing the References Cited Above.

*Primary Examiner*—Richard L Chiesa
(74) *Attorney, Agent, or Firm*—Baker & Hostetler LLP

(57) ABSTRACT

A device for purification of a gas flow containing condensable vapors including a shell (7) defining a sealed volume, a cooler to quench the gas flow, a rotating assembly (42) having a rotor (44) and a cylindrical separation and filtration skirt (54) composed of serrated circular rings (56) mounted on the rotor and rotating with it; a support tube (48) mounted on the rotor (44) and carrying a turbulator-scraper device (50) a cylindrical electrode (94) surrounding the separation and filtration skirt (54) and a central counter-electrode (78) to create an electrostatic field in the shell (7), a purified gas outlet tube, a condensates outlet pipe (40) and impact separation plates (64) fixed on the rings of the skirt.

14 Claims, 8 Drawing Sheets

U.S. PATENT DOCUMENTS

| | | | |
|---|---|---|---|
| 3,093,467 A | 6/1963 | McLaughlin | |
| 3,443,362 A * | 5/1969 | Ebert | 96/50 |
| 3,890,122 A | 6/1975 | Frantz | |
| 3,891,528 A * | 6/1975 | Griswold | 204/562 |
| 4,723,970 A | 2/1988 | Yokoyama | |
| 5,380,355 A * | 1/1995 | Brothers | 96/64 |
| 5,851,396 A * | 12/1998 | Saget | 210/512.3 |
| 5,917,138 A * | 6/1999 | Taylor | 96/61 |
| 6,663,695 B2 * | 12/2003 | Ike et al. | 96/52 |

FOREIGN PATENT DOCUMENTS

| | | |
|---|---|---|
| DE | 197 23 846 A1 | 6/1997 |
| WO | WO 92/08937 | 5/1992 |

* cited by examiner

DEVICE FOR PURIFICATION OF A GAS FLOW CONTAINING CONDENSABLE VAPOURS

TECHNICAL DOMAIN

This invention relates to a device for separation of condensable vapours from a gas flow that may or may not contain fines. More particularly, it relates to a device for maintaining the composition of the incondensable gas flow and for recovering condensates so that they can be used later or simply treated separately.

STATE OF PRIOR ART

Many physicochemical type processes (thermolysis, methanisation, etc.) generate potentially recoverable gases. However, they must firstly be purified to be compatible with quality criteria so that they can be used in other processes (cogeneration, synthesis of fuels, etc.). Therefore, the problem of treatment of these gases is a key point in the recovery process. Many technical solutions have been developed to solve this problem. They may be classified in six main families:

Thermal approach: this type of technique is the radical solution in that it is allowable to heat the recoverable gas to a high temperature. Allowable means that the gas can be heated without lowering the quality of the gas. However, this approach is not always allowable (apart from any economic consideration), for example in the case of the simultaneous presence of fuel and oxidant. Furthermore, this type of treatment cannot be used to recover separate species (because it usually causes partial or complete destruction of them) which can form an unacceptable handicap in the case in which these species (apart from the recoverable gas) are themselves potentially recoverable. Finally, energy efficiency considerations often make this approach not very cost effective.

Oxidising approach: if energy input to the gases to be purified is in the form of a chemical potential, usually through an oxidant that is often pure oxygen or oxygen in the air. In this configuration, unlike the purely thermal approach that simply consists of increasing the temperature of the gas to be treated, the treatment often consumes much less energy because the exothermicity of oxidation reactions is used. Nevertheless, the counterpart of this approach is not only destruction of condensable species which is a disadvantage if they are recoverable, but it also modifies the quality of the gases to be purified as a result of a dilution of species that might be recoverable under treatment conditions, by the oxidation product.

Separation by state change approach: this approach is based on the difference in the state change temperature of the constituent species of the gas to be purified, and particularly their condensation temperature. Variable temperatures may be necessary, which may lead to purification devices that are relatively difficult to use. Furthermore, the separation obtained is usually not complete due to physical limitations (considerations related to vapour pressure in particular). It is then always possible to improve the separation by using a medium facilitating capture of the species to be separated. This medium may equally well be liquid (such as a solvent injected into the separator by atomisation) or solid (of the fibre or membrane type) that can form the separation medium (see the separation by absorption—adsorption approach). The option of sparging to purify the gas can be relatively efficient even if it generates variable quantities of effluents with the concomitant risk of entraining part of the sparging liquid and therefore pollution of the gas to be treated.

Separation by mechanical effect approach: this approach is based on different effects:
  the centrifugal effect applied to constituent species of the gas to be purified and with different masses. The case of isotopic separation can be treated by this type of approach (ultra-centrifuging), even if it has the disadvantage that it is relatively expensive.
  The effect of impaction to encourage agglomeration of condensate particle fines and at the same time increasing the centrifuging effect.
  Filtration through a specific medium and/or the filtration deposition (cake) that itself acts as a medium created in situ, this phenomenon improving filtration.

Separation approach by affinity of electric charge (polarity effect), phenomenon used particularly in electrostatic precipitators for gas filtration.

Separation by absorption-adsorption approach, a phenomenon that is particularly effective when it occurs at low temperature.

These different approaches have generic disadvantages (degradation of product quality, efficiency, cost, etc.), but also limitations specific to each application to identify industrial applications. This is why new approaches have been developed combining a number of the above mentioned approaches:

Patent U.S. Pat. No. 4,723,970 relates to a gas/water separation device based on centrifugal separation. This device is compact but cannot give high level separation.

Patent DE 8 905 182 relates to a vapour liquid separation system with combined filtration. In particular, this assembly does not have any high level condensation function, which limits its application to purification of vapour forming part of a gas flow that may or may not be dirty.

Document WO 9 208 937 describes an assembly for extraction of condensable species from a gas flow by centrifuging coupled with cooling. It can only give limited purification, particular to the extent that no separation medium is used.

Document U.S. Pat. No. 3,890,122 relates to a multistage filtration apparatus using separation by centrifuging, condensation and filtration on the filter medium. This device has a number of disadvantages:

It is dedicated to treatment of compressed air. It is designed for specific purification and is limited particularly in that it relates to the presence of more or less volatile condensable vapours.

Separation by centrifuging is achieved mainly by a helical shell body, imposing a separation efficiency that depends on the operating flow or pressure (coupling of the device to a compressor). The device thus suffers from a lack of degrees of freedom in the manner in which it is controlled. Finally, it is not compact.

Therefore, the purpose of the invention is to disclose a device that overcomes these disadvantages, for purification of a gas flow. Thus, it should be compact considering the gas flows that it can process, it should not be sensitive to the presence of fines in the flow to be purified, and it must be able to operate continuously or at least minimising the frequency of cleaning the system. Its operating mode must also be flexible so that it can be operated differently according to the required separation conditions, for example it must be capable of generating a flow of condensates free of additives in the case in which the condensates form the noble material to be recovered. In general, it thus needs to adapt to purification of the gas flow itself (case in which the flow to be recovered is the gas) and to the recovery of condensable species (case in which the condensable vapours form the material to be recovered).

These purposes are achieved by the fact that the device for purification of a gas flow containing condensable vapours comprises a shell defining a sealed volume, a cooler to quench the gas flow, a rotating assembly comprising a rotor and a cylindrical separation and filtration skirt mounted on the rotor and rotating with it, a support tube mounted on the rotor and carrying a turbulator-scraper device, an electrode surrounding the separation and filtration skirt and a central counter-electrode to create an electrostatic field in the shell, a purified gas outlet pipe, a condensates outlet tube for evacuation while keeping the system leak tight.

The separation and filtration skirt is preferably composed of superposed serrated circular rings, at least one impact and separation plate being fixed on each of the rings of the skirt.

Advantageously, the separation and filtration skirt is composed of thermally insulating rings and thermally conducting impact plates, to give a controlled heat transfer between the zone inside the separation-filtration skirt and a thermostat controlled zone.

Also advantageously, the separation and filtration skirt is composed of absorbent materials capable of capturing condensable species.

In one embodiment, the thermostat controlled zone surrounds the separation and filtration skirt.

The purified gas outlet pipe may simultaneously act as a counter-electrode.

BRIEF DESCRIPTION OF THE FIGURES

Other special features and advantages of the invention will become clearer after reading the following description of example embodiments given with reference to the appended figures, wherein:

FIG. 1 shows a conventional block diagram in chemical engineering that represents a theoretical number of stages fixed by the process characteristics of the device, in a simplified manner. The device comprises a finite number of stages 2, 4, . . . n, as shown diagrammatically by the dashed lines 6. These stages are housed in a shell 7.

Figure 1:
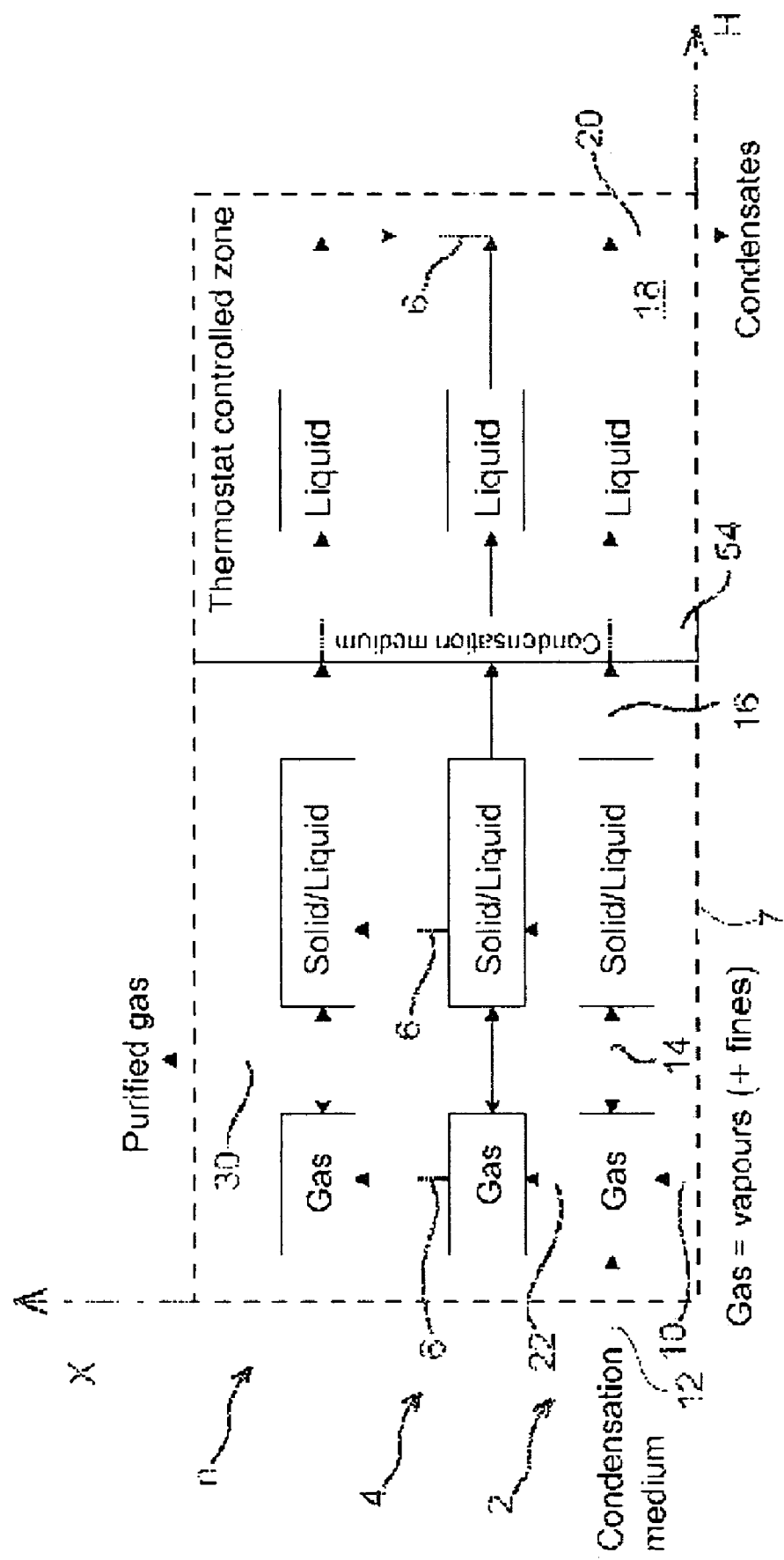
FIG. 1 is a block diagram showing a theoretical number of stages fixed by the process characteristics of the device.

The chain dotted line X diagrammatically represents the axis of rotation of the device. The vertical axis indicates an increasing degree of purification of the gas and the horizontal axis H indicates the distance to the axis of symmetry X of the device. The gas to be purified, diagrammatically shown by the arrow 10 penetrates into the first stage 2. A condensation medium 12 is introduced at this level. Some of the condensable vapours containing particles maintained in a solid-liquid equilibrium (condensed state) is extracted from the gas to be purified as shown diagrammatically by the arrow 14. When it comes into contact with the impact plates, the accumulated condensed phase is partially liquefied and can thus pass through (mark 55) the medium 54 while limiting entrainment of the gas phase from the thermostat controlled zone. The liquid is then extracted from the device as shown diagrammatically by arrow 20. The gas to be purified then passes to the second stage denoted by reference 4, as shown diagrammatically by the arrow 22. And so on. The purified gas exits from the upper part of the apparatus as shown by arrow 30.

Figure 2:
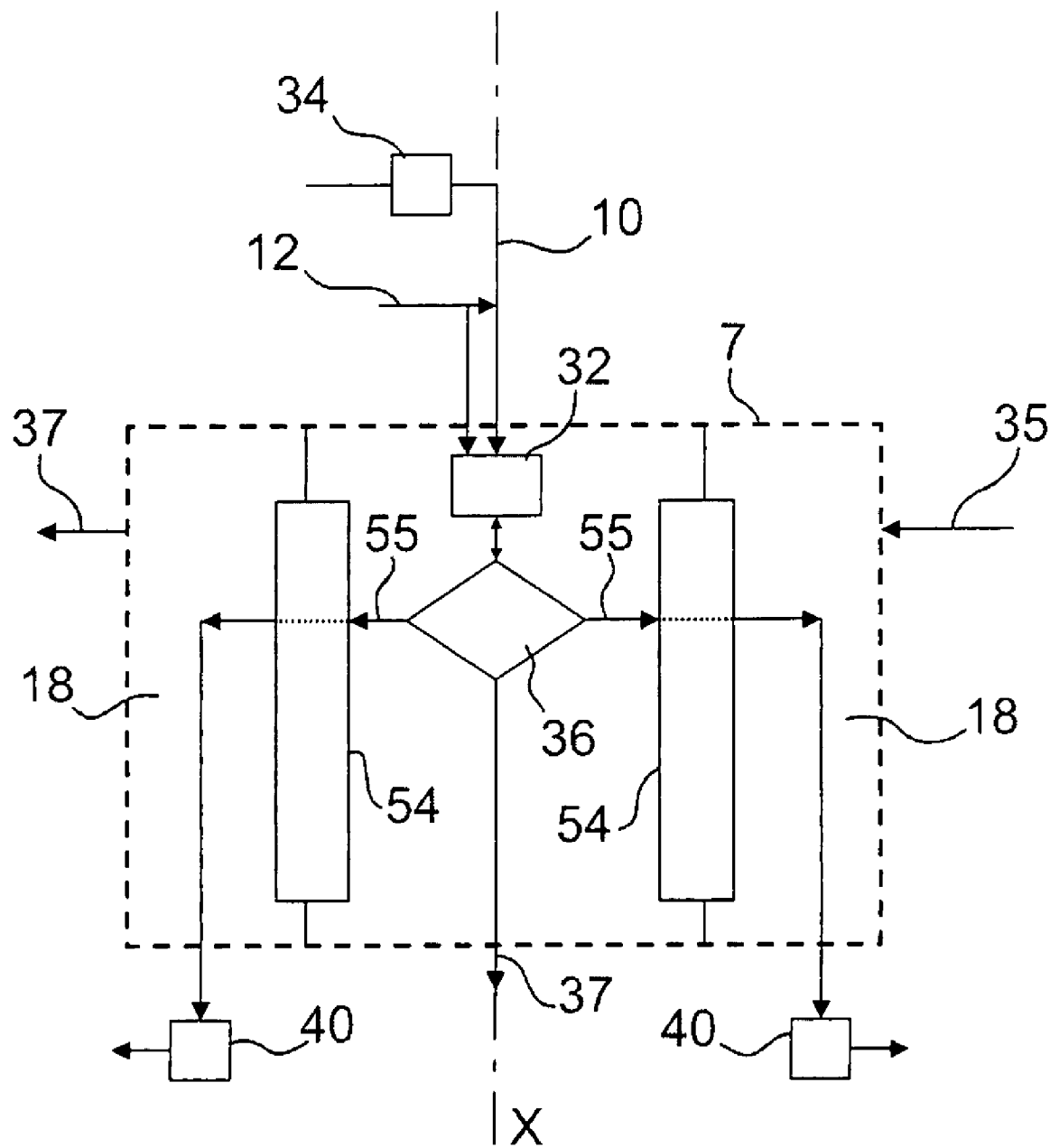
FIG. 2 is a block diagram representing flows and the main functions of a purification device according to the invention.

FIG. 2 is a block diagram representing the subsystems corresponding to the major functions of the device according to the inventions, in terms of flow and functions/elements. There is a heat exchanger 32, for example a cryocondensor cooled with liquid nitrogen, in the shell 7 mentioned above. The gas to be purified, referred to as reference 10, is mixed with a condensation medium denoted by reference 12. This condensation medium, also called additive, is chosen as a function of its physicochemical properties that need to be taken into account to obtain the best possible nucleation.

The gas flow 10 can optionally be pre-cooled before it is quenched in the heat exchanger 32, for example by circulation through a heat pipe 34. This cooling step enables an additional degree of freedom due to the possibility of quenching in the exchanger 32, in this sense, the heat pipe 34 is considered to not form part of the device delimited by the shell 7 diagrammatically shown by the dashed lines on FIG. 2.

The centrifuging function is represented by the diamond symbol 36. The gas flow then passes through a filter medium 54 arranged concentrically about the rotational axis of symmetry X of the device. The condensates are evacuated at the lower part of the apparatus by a pump or a siphon 40 maintaining the leak tightness of the system. The purified gas is output from 37. It may be recirculated in the thermostat controlled zone 18 (arrow 35) before it exits from this zone (arrow 37). The gas flow to be treated 10 may also be used for thermostat control of the zone 18 if necessary.

Figure 3:
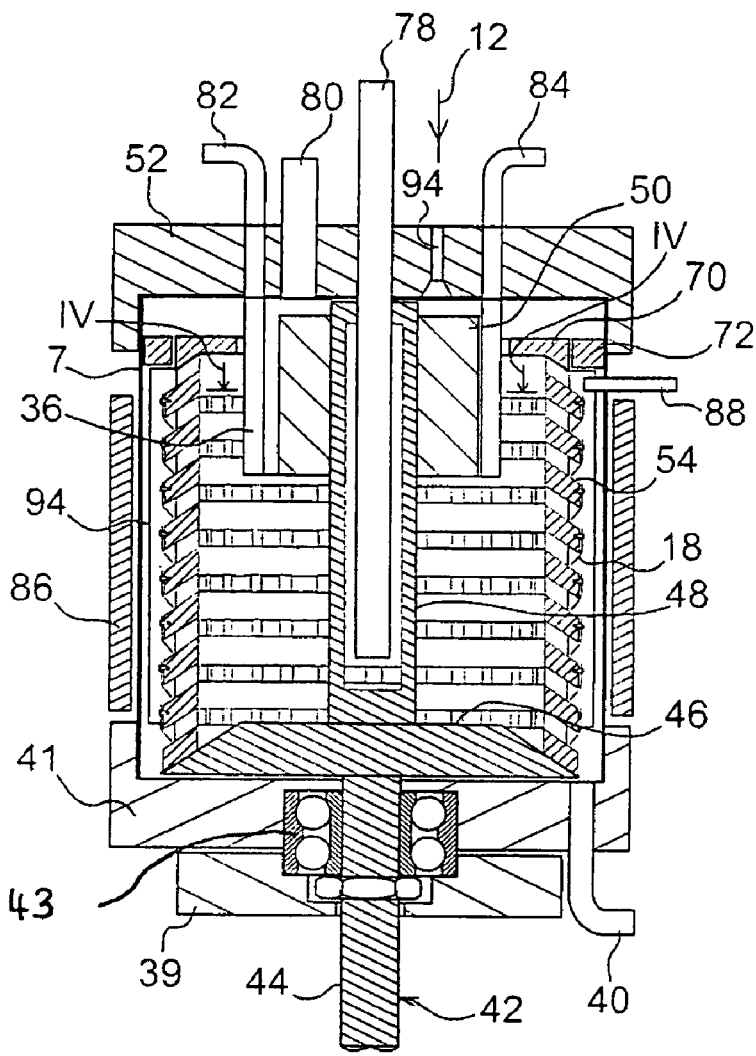
FIG. 3 shows a sectional view of an embodiment of a purification device according to this invention.

FIG. 3 shows an example embodiment of a purification device according to the invention. It comprises a base 39 and a lower flange 41 fixed with respect to the base 39. A shell 7 is mounted on the lower flange 41 and it carries an upper flange 52 in its upper part.

A rotating assembly 42 is mounted on the base 39 and on the flange 41 through a ball bearing 43. The rotating assembly 42 comprises an axis 44 on which a circular plate 46 is mounted with a perforated tube 48. It is driven in rotation, for example by means of an electric motor not shown. The perforated tube 48 carries three scraper combs 50 at its upper end, arranged at 120° from each other (see FIG. 4).

Condensates in the non-gas sense of the term (in other words liquids or solids) naturally tend to deposit and to agglomerate in some corners of the apparatus, particularly at cold fixed points, usually the inside peripheral wall of the exchanger 36. Therefore, it is essential to prevent these deposits that significantly reduce the heat exchange coefficient of the exchanger, so as to assure the cooling function. The scraper combs are specifically designed to prevent these deposits, by mixing the gas flow in the volume inside the exchanger 36.

A cylindrical separation and filtration skirt 54 is mounted on the plate 46 and rotates at the same time as this plate. As can be seen more clearly on FIGS. 5 and 6, the skirt 54 is composed of superposed rings 56. The rings 56 comprise gaps 60 that perform different functions including delimitation of perforated parts 62 from each other. Impact plates are fixed on the outside to each of the rings 56. For example, the plates 64 may be fixed by screws 66. Each plate 64 comprises a part 68, preferably inclined towards the inside of the skirt 54, that is located facing the perforated parts 62 and that forms the impact plate itself.

Due to this embodiment in the form of rings, the skirt 54 may be easily disassembled and purified. A support flange 70 maintains all rings. The flange 70 is mounted free to rotate with the rotor. It rotates with respect to a fixed bearing 72 that can achieve a variable quality rotating seal.

Furthermore, this design can combine necessary insulation between cold and thermostat controlled zones and maintenance of heat transfer so that the condensate can migrate towards the thermostat controlled part.

Figure 4:
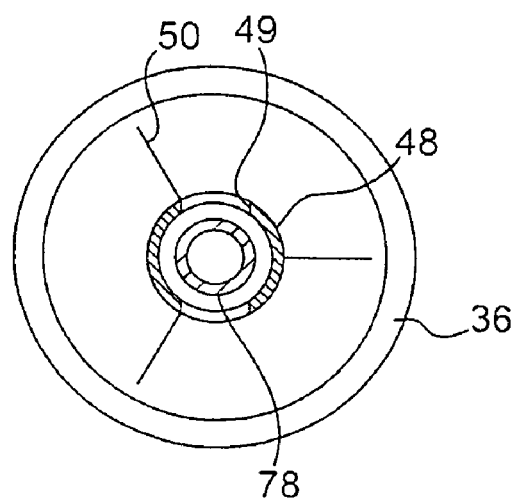
FIG. 4 is a partial sectional view along line IV-IV in FIG. 3.

As can also be seen on FIG. 4, the tube 48 comprises two longitudinal slots 49 designed to evacuate the gas flow through the tube 78.

A heat exchanger 36 is mounted under the upper flange 52. It is in the form of a cylindrical skirt that surrounds the perforated tube 48 with which it is located coaxially. The combs 50 rotate in the space delimited by the exchanger 36. A small clearance is provided between the end of the combs and the inner wall of the exchanger 36.

The tube 78 is mounted coaxially with the axis X of the device. The lower end of the tube 78 is housed inside the perforated tube 48. The upper part of the tube 78 passes through the upper flange 52. The treated gas exits through the tube 78. The gas to be treated enters through a tube 80 that passes through the upper flange 52. The tube 80 opens up into the volume defined by the internal wall of the cylindrical exchanger 36, in other words in the volume scavenged by the combs 50. Pipes 82 and 84 enable the arrival and evacuation respectively of cryogenic fluid, for example liquid nitrogen, in the exchanger 36.

A heating element 86 may optionally surround the shell 7. Furthermore, all or part of the treated flow (or even the flow still to be treated) evacuated through the tube 78 may be recirculated in the annular volume defined between the periphery of the skirt 54 and the shell 7 through the pipe 88 so as to form a thermostat controlled zone 18.

An auxiliary fluid may also be injected through an orifice 90. The function of the orifice 90 is to introduce the condensation medium corresponding to reference number 12 (see FIG. 2) and therefore to facilitate nucleation. It enables precipitation of a condensate fog. This additive atomised on the input side of quenching is chosen for its physicochemical properties (condensation temperature, polarity, miscibility, permittivity) adapted to the required purification case, particularly if the objective is either to recover the condensate, or if the priority is to purify the flow entering the system.

In one preferred embodiment, a cylindrical electrode 94 is arranged at the output from the skirt 54. The electrode 94 may be arranged inside the shell 7 as shown on FIG. 3, or outside this shell. Advantageously, the treated gas flow evacuation tube 78 acts as a counter electrode. A potential difference, usually fixed, is set up between the electrode 94 and the counter electrode 78 so as to encourage electrostatic precipitation. The condensation medium will preferably be chosen so as to facilitate this precipitation (combined consideration between the diameter of particles formed by condensation of the mix), media-auxiliary (pipe 90)/condensate and the permittivity of these particles).

The rotating assembly 42 enables the flow to be centrifuged at sufficiently high speeds for a separation rate of the condensate particles adapted to the required purification case. This step enables particles to migrate to the filter medium, in fact the filtration and separation skirt 54, at a sufficiently high speed with respect to their residence time in the purification device. For the design of the centrifuging zone, as a first approximation it is possible to determine the limiting migration speed of a particle assuming that the centrifugal and Stokes forces are equal, such that it can be evaluated for particles for which the equivalent average diameter is between approximately 1 and 50 μm. Therefore the time necessary for a particle to sediment can be expressed as follows:

$$t = Kc \cdot \frac{\log(a/Rtube)}{(ND)^2} \quad (1)$$

where $Kc = \frac{9\eta}{2\pi^2 \Delta \rho}$ and:

N: rotation frequency a: rotation radius

Rtube: radius of the tube at the output from gas to be purified (non-free zone)

D: particle diameter

η: viscosity of gas to be purified

Δρ: difference in density between the condensate particles and the gas to be treated.

Based on relation (1), it is possible to represent the particle sedimentation time as a function of their average diameter for a given design and rotation speed. Thus, the straight-line on a logarithm scale is expressed as follows:

Log $(t)$=−2log$(D)$+(log $K$−2log $N$) where $K=Kc$ log $(a/Rtube)$

It is then possible to define the limiting gas flow (Q) at the output from the centrifuge using the following expression for a given centrifuged volume (V):

$Q=V/t$

Apart from sedimentation times as a function of the rotation speed, it is useful to be able to estimate the additional pressure at the wall due to the applied centrifugal force. Apart from considerations related to the design of structural elements, an additional pressure induced by centrifuging will facilitate the condensation process.

Assuming a basic movement causing a rigid body rotation and neglecting the influence of particles on the pressure gradient, a radial pressure profile can be expressed in the centrifuge using the following expression:

$$\frac{P(r)}{P(a)} = \exp\left[\frac{M(\Omega a)2}{2RT}\left(1 - \frac{r^2}{a^2}\right)\right]$$

where

P(r): local pressure at radius r

P(a): local pressure at radius a

M: mass of the vector gas

T: temperature of the medium

Ω: angular rotation speed

Thus, the orders of magnitude of the size and rotation speed can be deduced for a given flow to be treated.

Centrifuging is optionally given preference by the combined action of an electrostatic field generated within the separation zone, as explained above. The migration velocity Uc (or the collection velocity) of condensate particles due solely to electrostatic effect can be expressed by a relation of the following type:

$$Uc = \left(1 + 2\frac{\varepsilon_r - 1}{\varepsilon_r + 2}\right)\frac{I.D}{k\mu}$$

The intensity (I) to be applied to the collection electrode to obtain a given migration speed can be deduced for a given nature (relative permittivity ($\varepsilon_r$) and diameter (D)) of condensate particles. This electrostatic effect is added to the inertial separation effect in as far as the particles can be electrified under standard operating conditions of electrostatic precipitators.

Note also that by applying a sufficient rotation speed, a local additional pressure at the filter medium 54 induced by the centrifugal force, facilitates the condensation phenomenon.

The filter medium 54 can be used to build up an impact barrier facilitating recondensation of condensate particles and enrichment of condensates on the side of the shell 7. Components of the medium are advantageously composed of thermally insulating elements followed by heat conducting elements in the radial direction varying from the internal zone of the filter medium 54 towards its outside face (facing the thermostat controlled zone 18); this assures that the temperature is maintained both at the centrifuge end (inside the skirt 54) and at the shell 7 so as to facilitate transfer of the condensate and then its flow before it is evacuated through the continuous purge systems 40.

Figure 5:
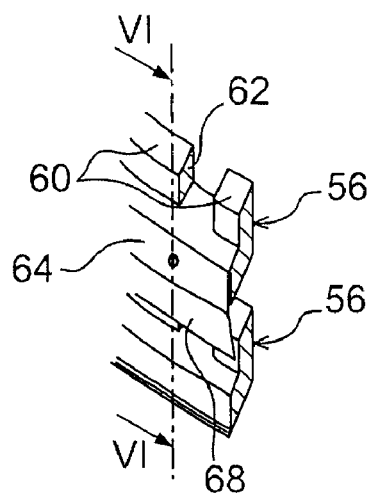
FIG. 5 is a detailed view of the separation and filtration medium of the device in FIG. 3.
Figure 6:
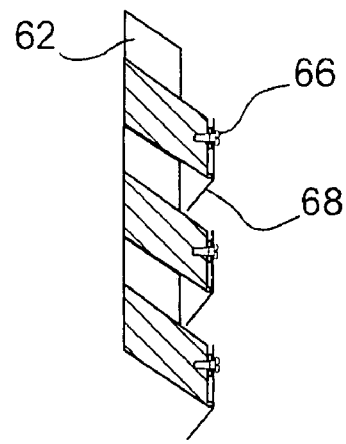
FIG. 6 is a sectional view along mark VI-VI in FIG. 5.
Figure 7:
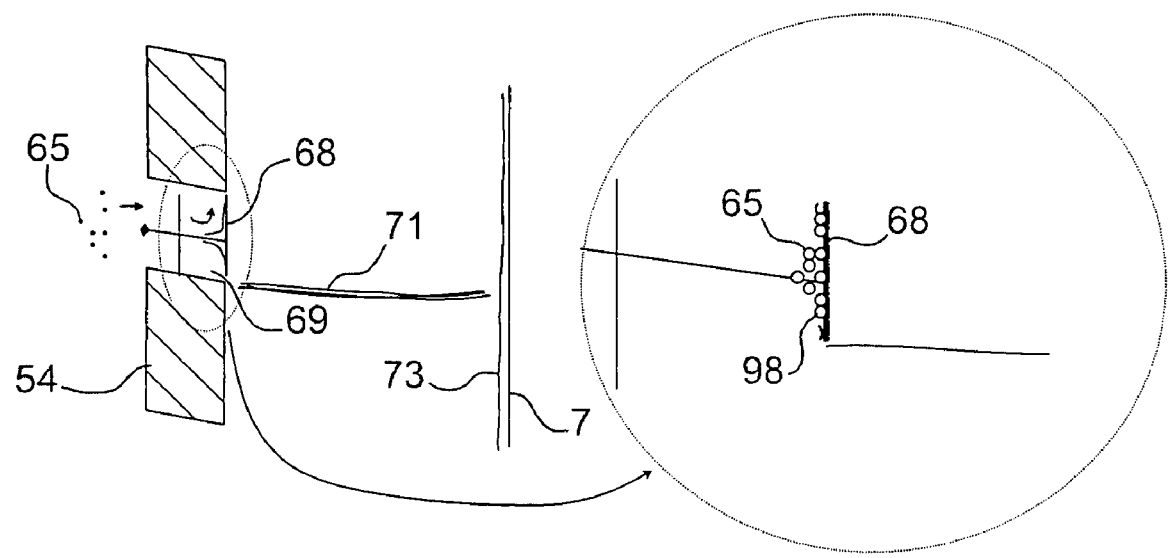
FIG. 7 illustrates the principle of separation and transfer of condensates.

The objective is to form aggregates 69 of solid/liquid particles on the inside faces of the impact plates 68 (FIGS. 5 and 6). The small controlled temperature gradient imposed by the thermostat controlled zone 18 then enables liquefaction and the formation of a condensate film 98 (FIG. 7) that can be evacuated through clearances 69 formed between the impact and temperature distribution elements 68 and the separation medium (skirt 54) also acting as a thermal barrier. A liquid jet 71 strikes the shell 7 and a liquid film 73 is deposited on it. The passages 69 also help to control the head loss at the medium and to compensate for it getting clogged, particularly if it is composed of absorption-adsorption capture elements.

The performances of the device according to the invention depend on the combined effects of centrifuging, impact, cooling, electrostatic field, nucleation and finally adsorption. Nevertheless, apart from a combination of these separation approaches and adaptability of the process, the new factor with this invention is in the method of separation/purification combining a phase change and a combined separation. To achieve this result and minimize gas entrainment in condensates or vice versa, condensates in the gas flow, a film of solid material composed of condensable materials (mixed or not mixed with a condensation medium if the objective is to recover condensables or rather to reuse the gas flow), itself forms an interface guaranteeing separation of flows. The heat flow imposed on the zone outside the filter medium (thermostat controlled zone) is capable of maintaining an equilibrium and a temperature gradient between the solid film and the impact and thermal distribution plates. Thus, by progressively changing from a solid state to a liquid state, condensables migrate outside the inlet area of the gas containing condensables to the thermostat controlled zone while forming a skin preventing entrainment of charged gas. The instrument is designed so that it is possible to vary the film thickness (for example by applying an appropriate temperature in the thermostat controlled zone) to obtain variable separation performances depending on the nature of the condensables.

The above description for the distribution plate part is also (optionally) applicable to the filter medium zone if the filter medium zone is composed of absorbent materials that can capture condensable species. The adjustment (for example by adjusting the rotation speed of the device or choosing a specific nature of a absorption medium) between absorption force and centripetal force can be used to control the clogging ratio of the medium and consequently the quantity of condensable species migrating towards the collection zone.

Thus, depending on the nature of the condensables (in other words mainly depending on their behaviour with regard to the condensation effect, formation of solid, and formation of the more or less viscous liquid), it will be possible to give preference to one of the above mentioned separative technological adaptations.

Figure 8:
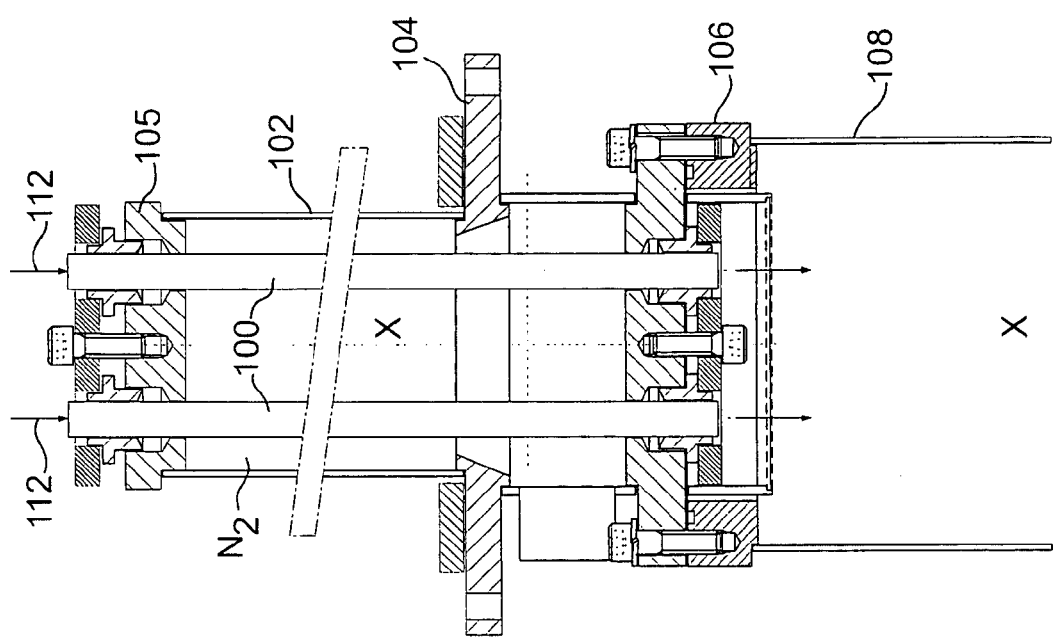
FIG. 8 shows a sectional view of a cryocondensor that will be used in a purification device according to the invention.

FIG. 8 shows a sectional view of another embodiment of a cryocondensor that can be used within the framework of a device for purification of a gas flow according to the invention. It comprise a tube bundle 100 (only two tubes are shown in FIG. 8) inside a cylindrical skirt 102 itself fixed on a flange 104. The tubes 100 are fixed at their upper ends to a flange 105, and at their lower ends to a flange 106. A skirt 108, for example made of stainless steel, is installed under the flange 106. The gas to be purified is introduced into the bundle of tube 100, as shown diagrammatically by the arrows 112. It opens up into the inside volume defined by the skirt 108. A cryogenic liquid, for example liquid nitrogen, circulates around the tubes 100 so as to quench the gas to be purified.

Figure 9:
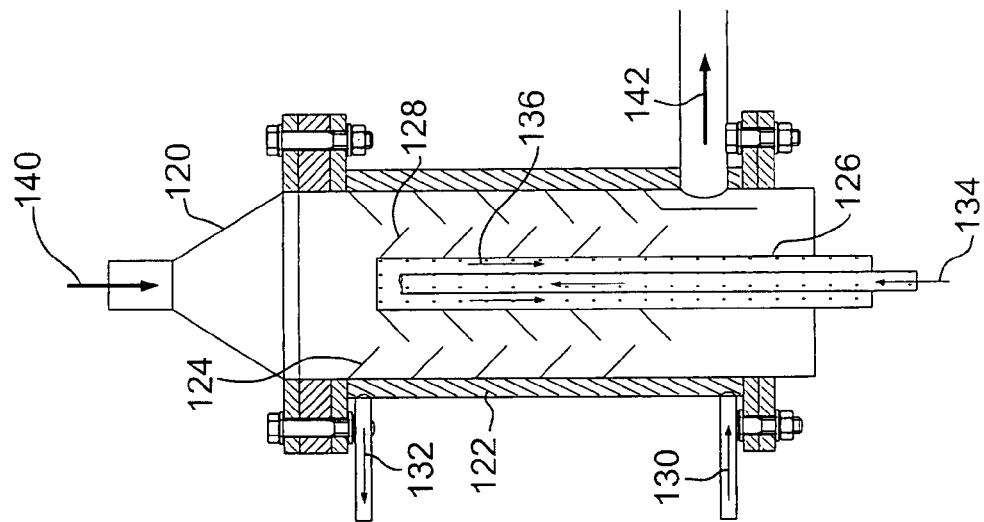
FIG. 9 shows a diagrammatic sectional view of a plate devesiculator used as a reference.

FIG. 9 shows a plate devesiculator used as a reference so that its performances can be compared with the performances of a component device conforming with the invention (cryocondensor). This appliance is simple in construction, and has a cone 120 in its upper part. This cone is connected to an external cylinder 122 on the internal wall of which a series of conical shaped plates is arranged 124. An inner tube 126 is arranged in the tube 122 coaxially with this tube. The inner tube 126 also carries conical shaped or tapered plates 128. The inner tube 122 and the outer tube 126 are cooled to a temperature of −5° C. to −10° C. by circulation of a heat transport fluid, usually glycolated water. The entry of glycolated water into the outside tube is represented by the arrow 130 and its exit is represented by the arrow 132. The arrows 134 and 136 diagrammatically show the evacuation of glycolated water in the inner tube 126.

The flow to be purified is introduced into the upper part of the cone as shown diagrammatically by arrow 140. It follows a sinuous path defined by the tapered elements 124 and 128 before leaving the apparatus through its lower part as shown diagrammatically by the arrow 142.

EXAMPLE

Purification of tar type condensates.

No other effects that a consideration of the condensable species by means of a plate devesiculator, the gas flow to be treated (biomass pyrolysis gas done at about 500° C.) still contains enough condensates to disturb the flow measurement given by a Coriolis type flowmeter. The condensate content in the flow changes from 100 gr/Nm$^3$ to about 10 gr/Nm$^3$. (See FIG. 10).

Passage times of gases to be treated are of the order of a tenth of the second. In this case, two plate devesiculator arranged in series, for example of the type shown on FIG. 9, have been used to obtain the above mentioned purification level.

An additional cryocondensor device like that shown on FIG. 8 was installed and used to improve the purification by removal of tar in the gas flow, at the outlet from the two plate devesiculators. Complementary purification tests carried out with this device (skin temperature about −90° C.) have made it possible to observe the possibility of forming condensate particles with variable diameters rarely larger than 0.5 mm, depending on the moisture content in the gas to be purified. The residence times in this apparatus are equal to about one second.

Figure 14:
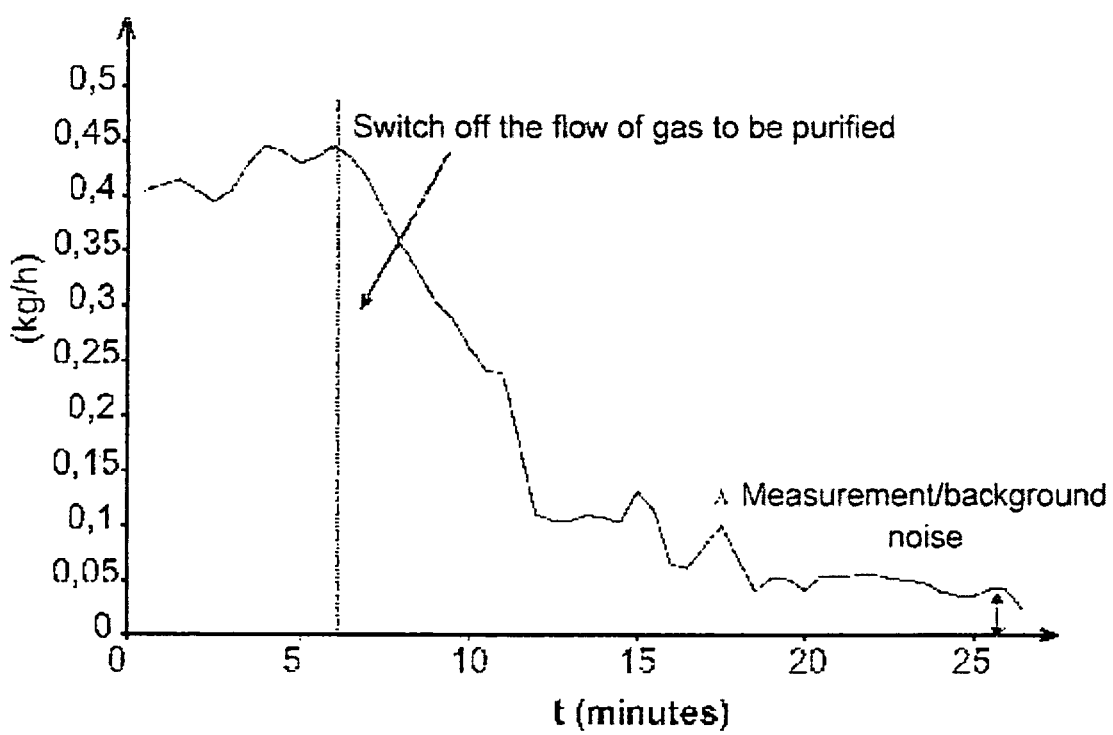

The result of this purification is shown in FIG. 14.

Passage times of gases to be treated are of the order of a tenth of the second. In this case, two plate devesiculators arranged in series, for example of the type shown on FIG. 9, have been used to obtain the above mentioned purification level.

Figure 10:
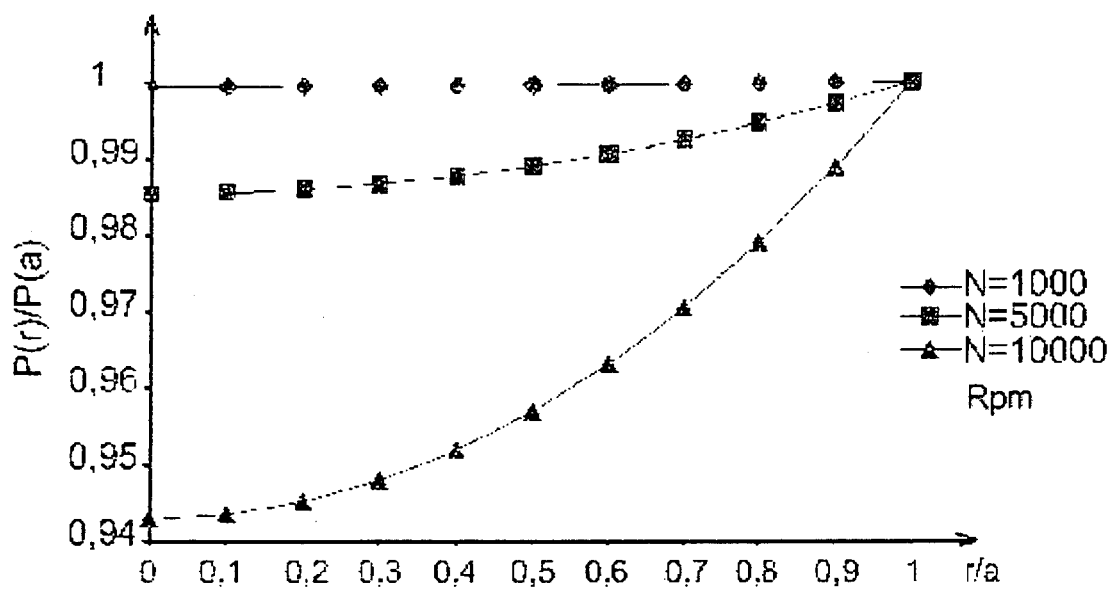
FIGS. 10 to 14 are comparative curves that demonstrate the advantages of a device according to the invention.
Figure 11:
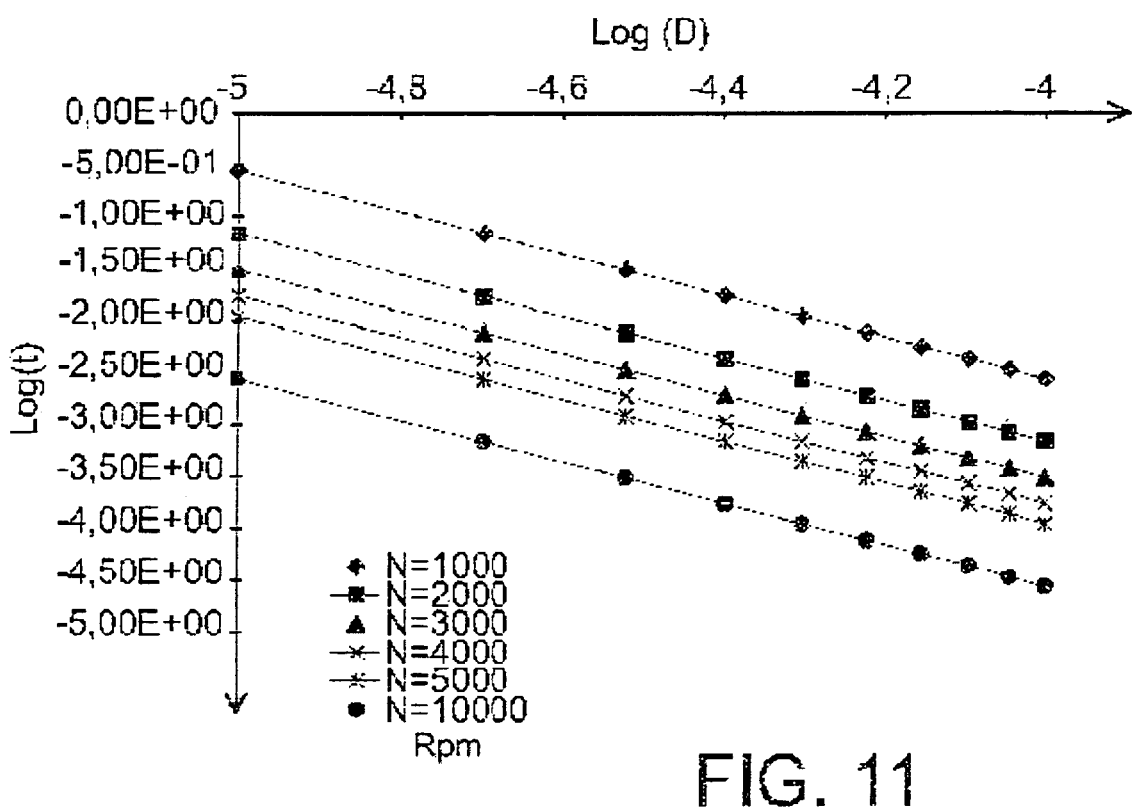
Figure 12:
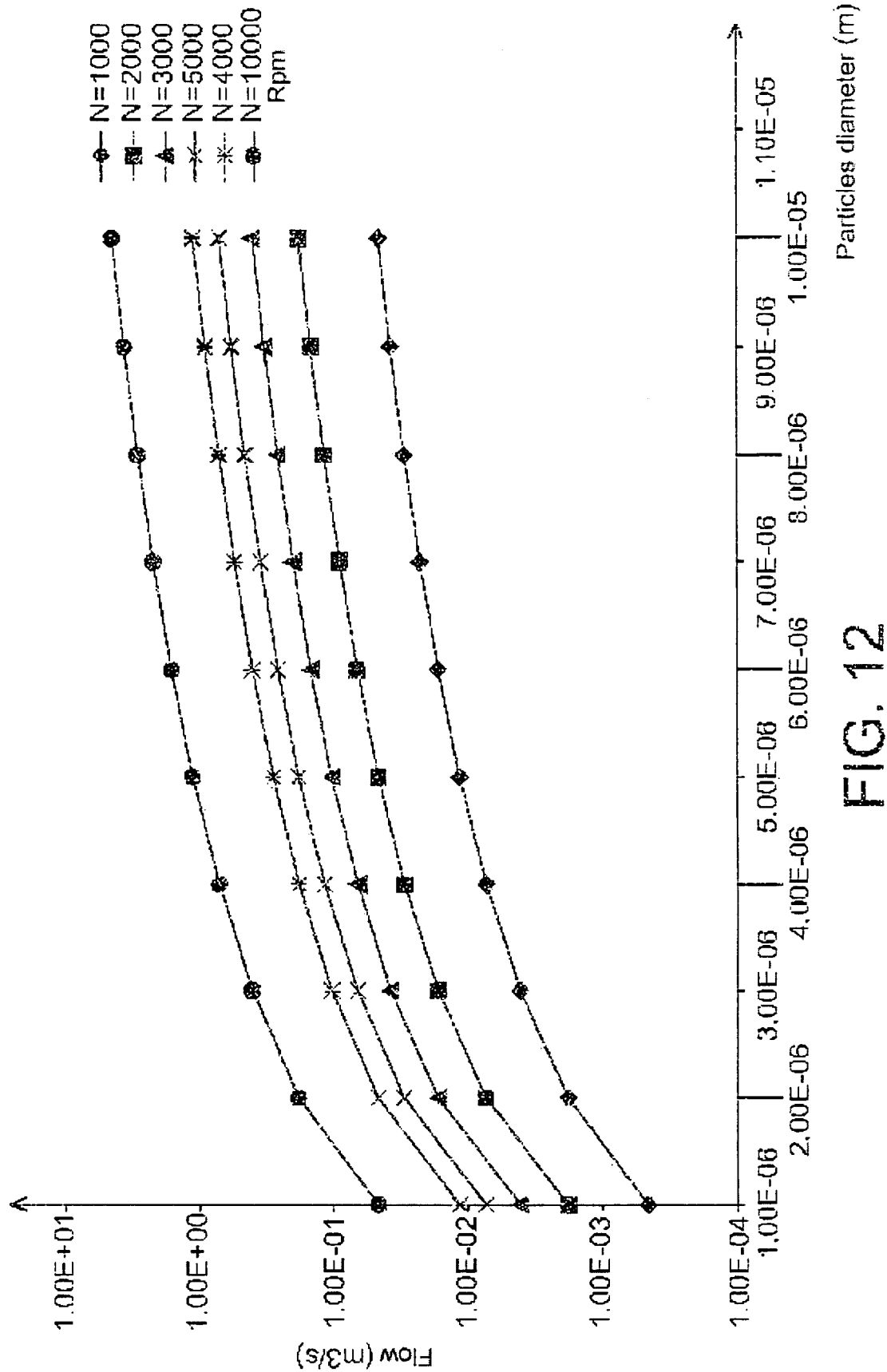
Figure 13:
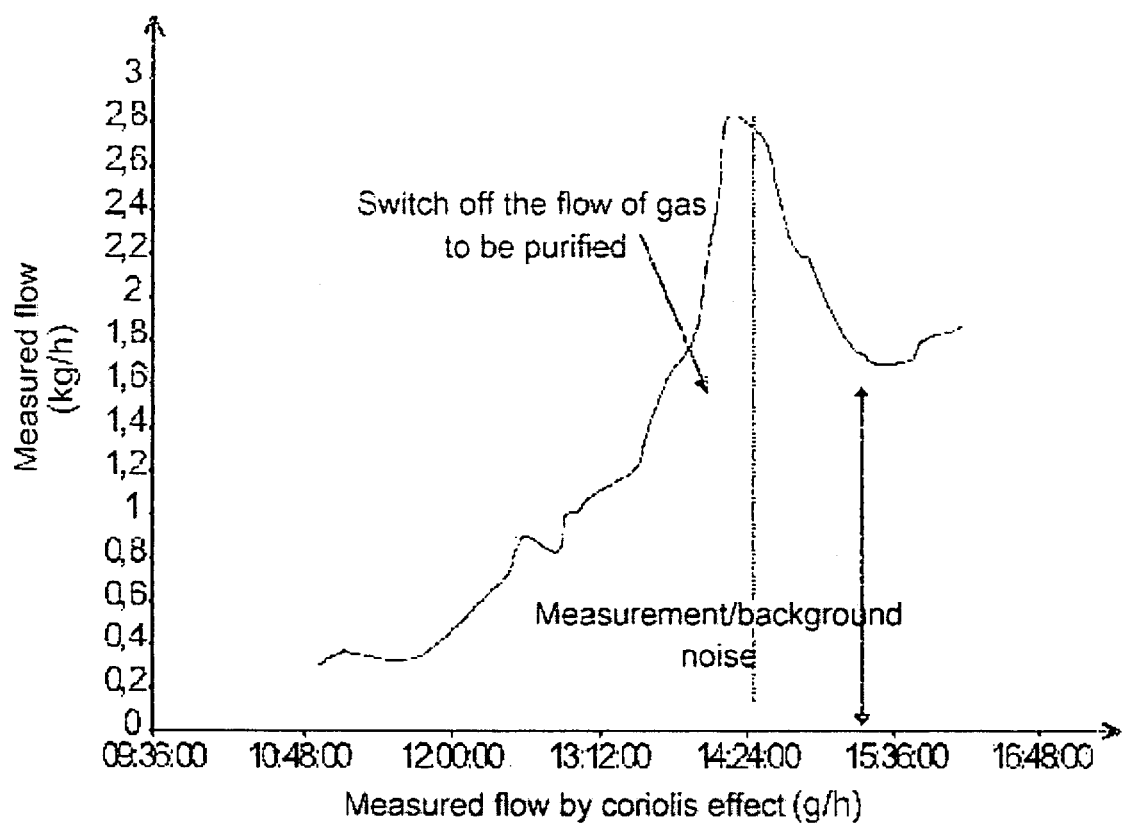

FIG. 10 shows the ratio between the local pressure and the pressure at the wall (P(r)/P(a)) as a function of the radius (r/a). FIG. 11 shows sedimentation times as a function of the particle diameter (inertial effect only) and FIG. 12 shows the maximum gas flow used to reach the particle sedimentation time. FIG. 13 indicates the flow measured using the Coriolis effect with a plate separator and FIG. 14 shows a system using a cryocondensor and filter medium.

The calculations were made based on the following assumptions:

A=0.1 m
T=310K
M=28 g/mol
Rtube=0.01 m
Δρ=984.4 kg/m$^3$
η=1.65.10$^{-5}$Pa·s
V=0.013 m$^3$
Nature of tars: naphthalene

| Indicative characteristics (orders of magnitudes) of the separator | |
|---|---|
| Cooling power per unit volume | 70 W/m$^3$ |
| Separator volume per volume flow of gas to be treated | 0.002 m$^3$/(m$^3$/h) |
| T input | 500K |
| ΔT (inlet-outlet) | 200K |
| Critical diameter for particles to be trapped | 10 μm |
| Upstream concentration of condensables (C10H8) | from 50 to 5 g/m$^3$ |
| Downstream concentration of condensables (C10H8) | <0.1 g/m$^3$ |
| Maximum allowable water content in the gas to be treated | 10% by density |

The invention claimed is

1. Device for purification of a gas flow containing condensable vapours, characterised in that it comprises a shell (7) defining a sealed volume, a cooler (36) to quench the gas flow, a rotating assembly (42) comprising a rotor (44) and a cylindrical separation and filtration skirt (54) mounted on the rotor and rotating with it, a support tube (48) mounted on the rotor (44) and carrying a turbulator-scraper device (50), an electrode (94) surrounding the separation and filtration skirt (54) and a central counter-electrode (78) to create an electrostatic field in the shell, a purified gas outlet tube (78), a condensates outlet pipe (40) for evacuation while making the system leak tight.

2. Purification device set forth in claim 1, characterised in that the separation and filtration skirt (54) is composed of superposed serrated circular rings (56), an impact and separation plate (64) being fixed on each of the rings (56) of the skirt.

3. Purification device set forth in claim 2, characterised in that the separation and filtration skirt (54) is composed of thermally insulating rings and thermally conducting impact plates, to give a controlled heat transfer between the zone inside the separation-filtration skirt and a thermostat controlled zone (18).

4. Purification device set forth in claim 2, characterised in that the separation and filtration skirt (54) is composed of absorbent materials capable of capturing condensable species.

5. Purification device set forth in claim 1, characterised in that a thermostat controlled zone (18) surrounds the separation and filtration skirt (54).

6. Purification device set forth in claim 1, characterised in that it comprises the purified gas outlet tube (78) that simultaneously acts as the counter-electrode.

7. Purification device set forth in claim 3, characterised in that the separation and filtration skirt (54) is composed of absorbent materials capable of capturing condensable species.

8. Purification device set forth in claim 2, characterised in that a thermostat controlled zone (18) surrounds the separation and filtration skirt (54).

9. Purification device set forth in claim 3, characterised in that the thermostat controlled zone (18) surrounds the separation and filtration skirt (54).

10. Purification device set forth in claim 4, characterised in that a thermostat controlled zone (18) surrounds the separation and filtration skirt (54).

11. Purification device set forth in claim 2, characterised in that it comprises the purified gas outlet tube (78) that simultaneously acts as the counter-electrode.

12. Purification device set forth in claim 3, characterised in that it comprises the purified gas outlet tube (78) that simultaneously acts as the counter-electrode.

13. Purification device set forth in claim 4, characterised in that it comprises the purified gas outlet tube (78) that simultaneously acts as the counter-electrode.

14. Purification device set forth in claim 5, characterised in that it comprises the purified gas outlet tube (78) that simultaneously acts as the counter-electrode.

* * * * *